United States Patent
Kondo (10) Patent No.: US 7,006,702 B2
(45) Date of Patent: Feb. 28, 2006

(54) IMAGE CODING DEVICE (75) Inventor: Tsuyoshi Kondo, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 549 days.

(21) Appl. No.: 09/971,727

(22) Filed: Oct. 5, 2001

(65) Prior Publication Data
US 2002/0076113 A1 Jun. 20, 2002

(30) Foreign Application Priority Data
Oct. 5, 2000 (JP) .............................. 2000-305829

(51) Int. Cl.
G06K 9/36 (2006.01)

(52) U.S. Cl. ...................... 382/247; 382/244; 382/238; 345/643; 377/49; 708/490

(58) Field of Classification Search ................ 382/247, 382/244, 232, 243, 248, 238, 239, 240, 245, 382/246; 341/51, 107, 50, 67, 59; 712/221; 345/643; 377/49; 708/490, 306; 714/722; 358/426.02, 426.03, 426.04, 426.05, 426.06, 358/ 426.07, 426.08, 426.09, 426.1, 426.11, 426.13; 370/465; 700/28, 173, 250; 702/181
See application file for complete search history.

(56) References Cited

U.S. PATENT DOCUMENTS

| | | | |
|---|---|---|---|
| 5,592,163 A * | 1/1997 | Kimura et al. ............... | 341/107 |
| 6,236,759 B1 * | 5/2001 | Horie et al. ................. | 382/244 |
| 2002/0196373 A1 * | 12/2002 | Szybiak et al. ............. | 348/700 |
| 2003/0081850 A1 * | 5/2003 | Karczewicz et al. ........ | 382/247 |
| 2003/0212879 A1 * | 11/2003 | Henkel et al. .............. | 712/208 |
| 2004/0037421 A1 * | 2/2004 | Truman ....................... | 380/200 |
| 2004/0070526 A1 * | 4/2004 | Horie .......................... | 341/107 |
| 2004/0234146 A1 * | 11/2004 | Ammicht et al. ........... | 382/240 |

* cited by examiner

Primary Examiner—Kanjibhai Patel
Assistant Examiner—Ali Bayat
(74) Attorney, Agent, or Firm—RatnerPrestia (57) ABSTRACT The image coding device comprises data adding means for adding specific data to input image data at the end of image data, and arithmetic coding unit not issuing remaining output code of code register after coding of final input data. In this constitution, increase of circuit scale can be suppressed and decline of operation clock can be prevented.

1 Claim, 15 Drawing Sheets

■ Coding pixel
▨ Reference pixel

IMAGE CODING DEVICE

BACKGROUND OF THE INVENTION

1. Field of the Invention

The present invention relates to an image coding device for coding binary image data by arithmetic coding.

2. Description of the Related Art

Figure 3:
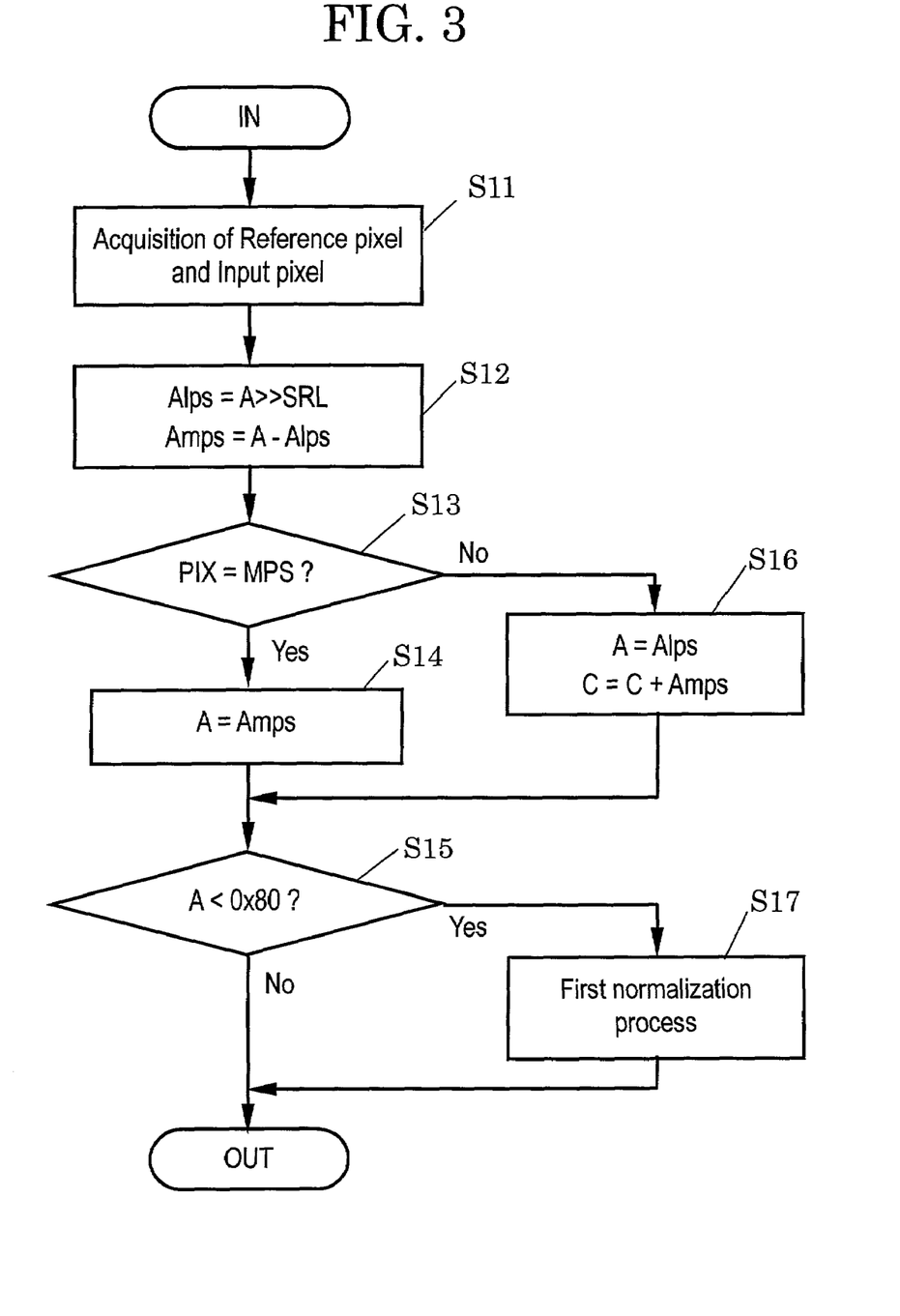
FIG. 3 is a flowchart showing first coding process in the invention.
Figure 4:
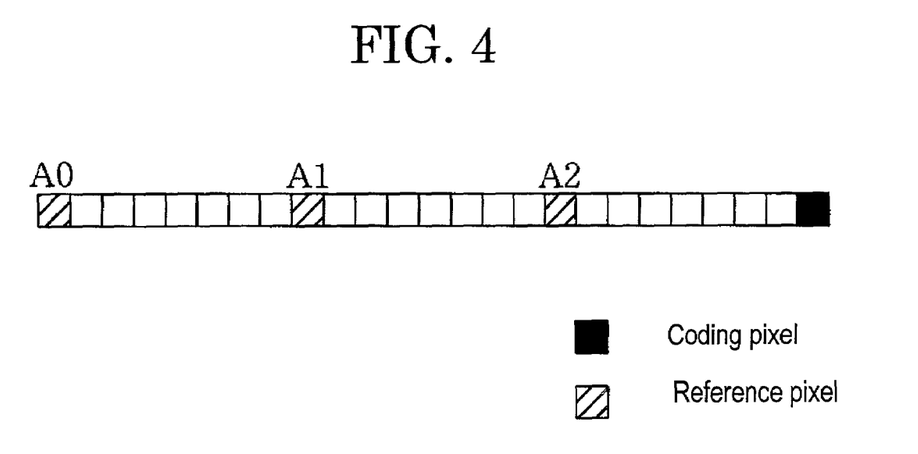
FIG. 4 is a diagram showing reference pixel and coding pixel in the invention.
Figure 5:
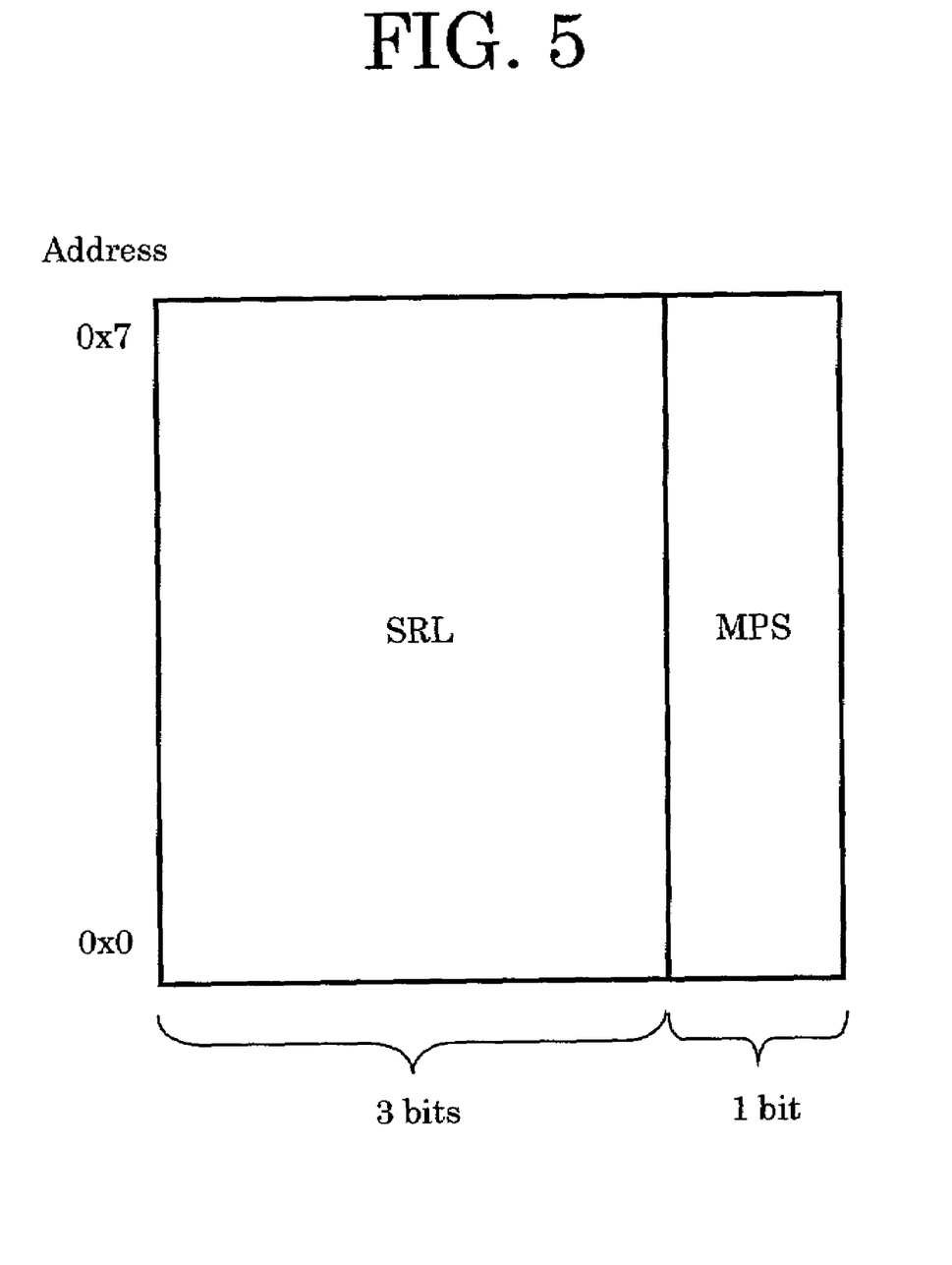
FIG. 5 is a data diagram showing data of prediction table in the invention.
Figure 6:
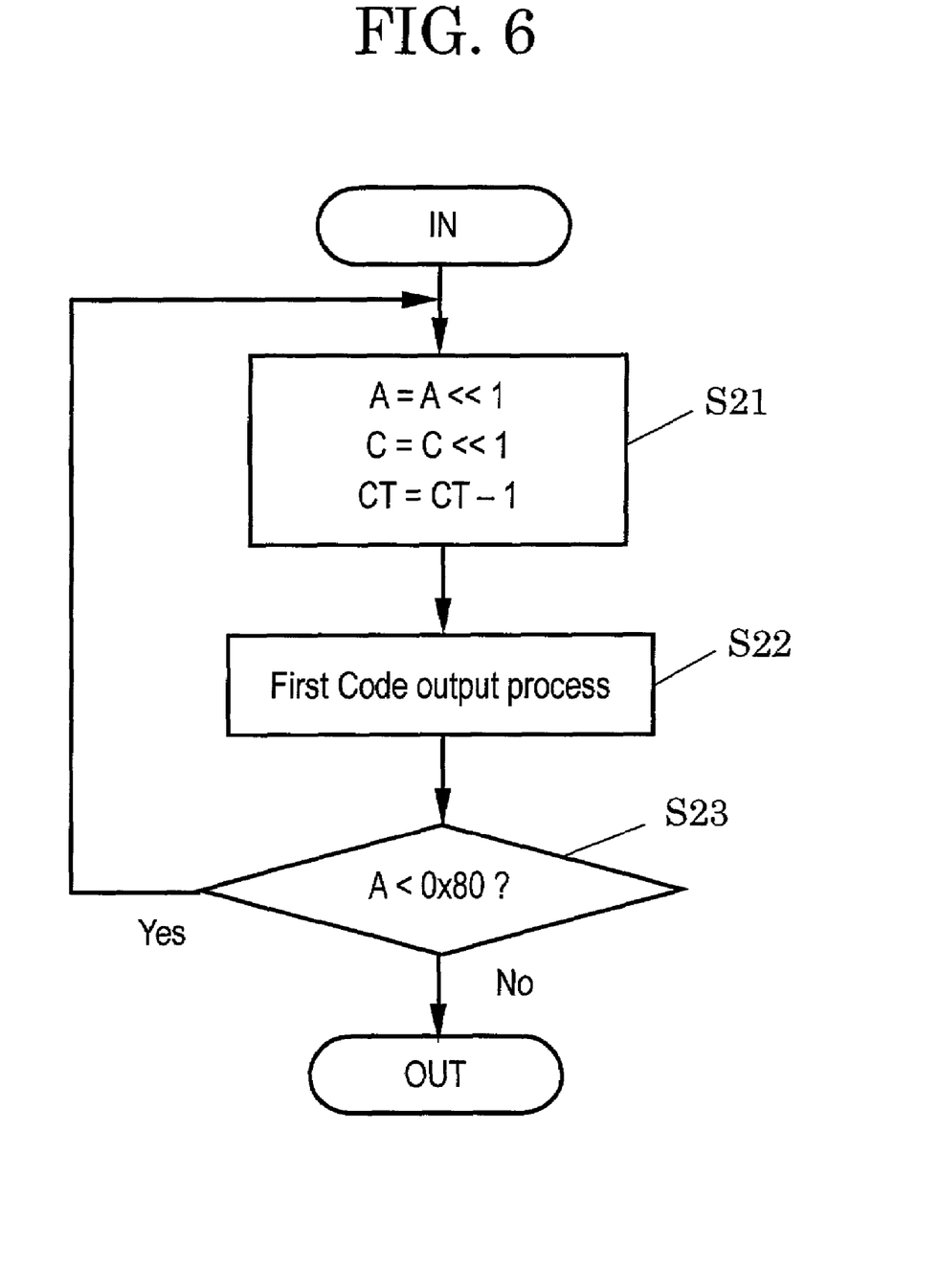
FIG. 6 is a flowchart showing first normalizing process in the invention.
Figure 7:
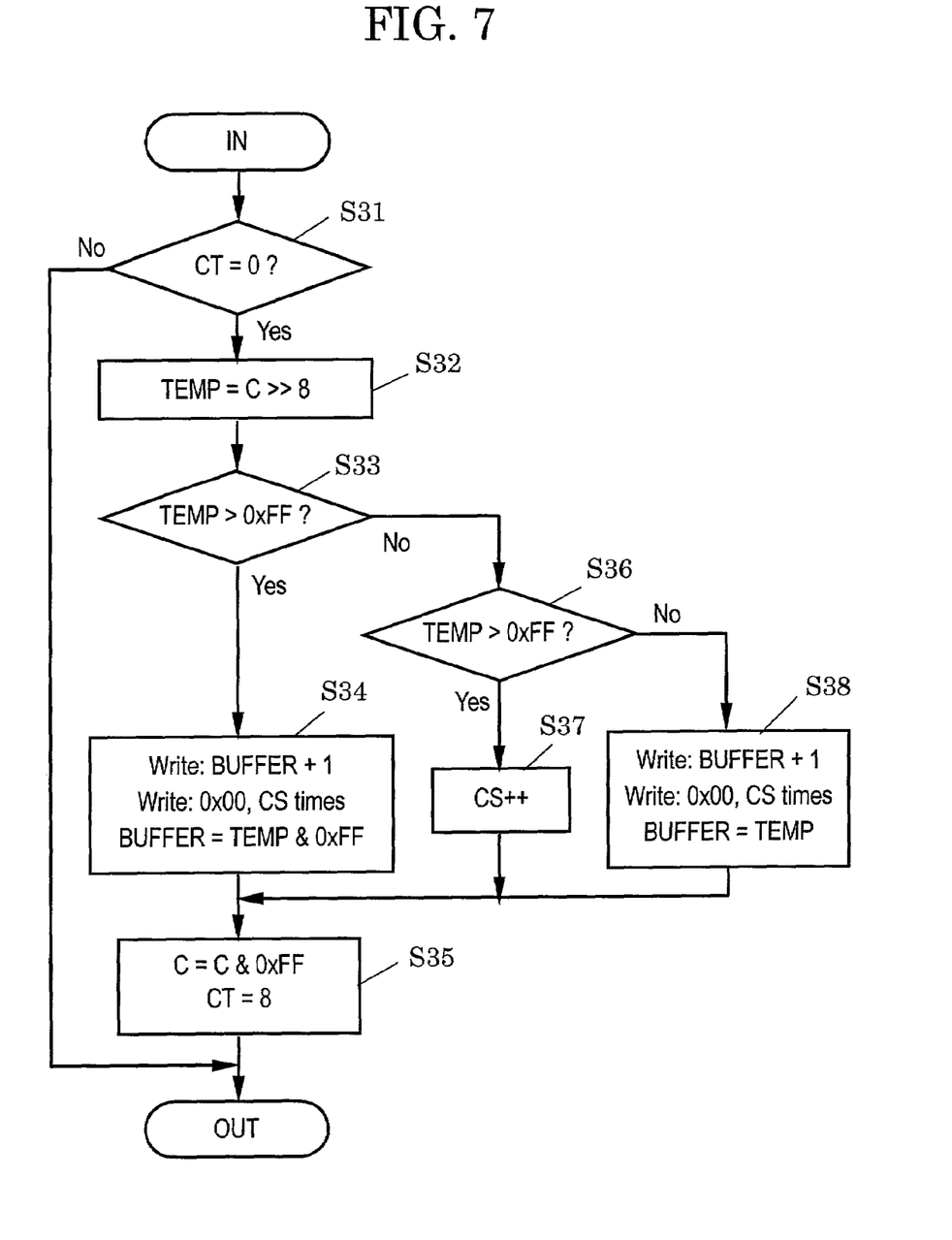
FIG. 7 is a flowchart showing first code output process in the invention.
Figure 13:
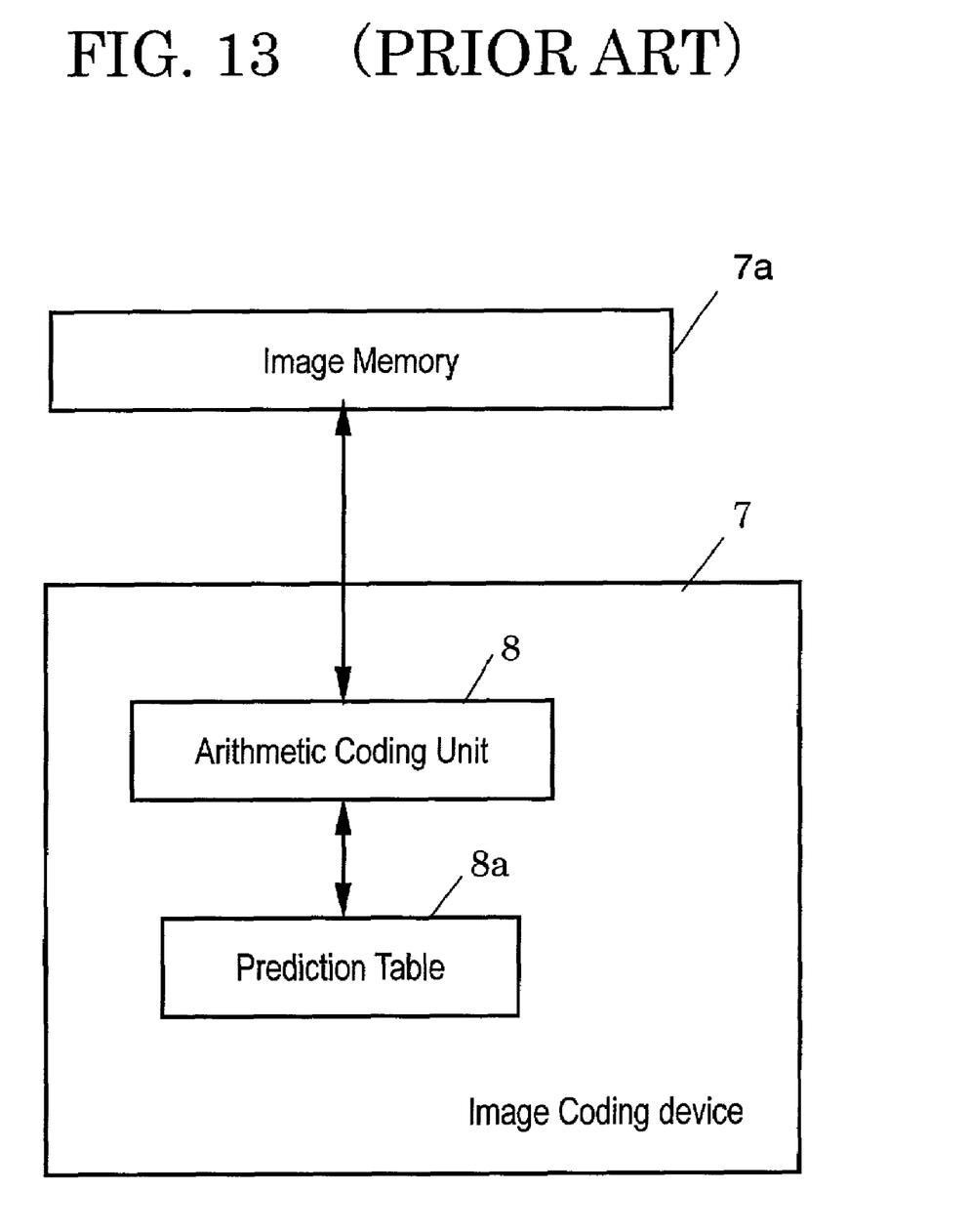
FIG. 13 is a block diagram of a conventional image coding device.
Figure 14:
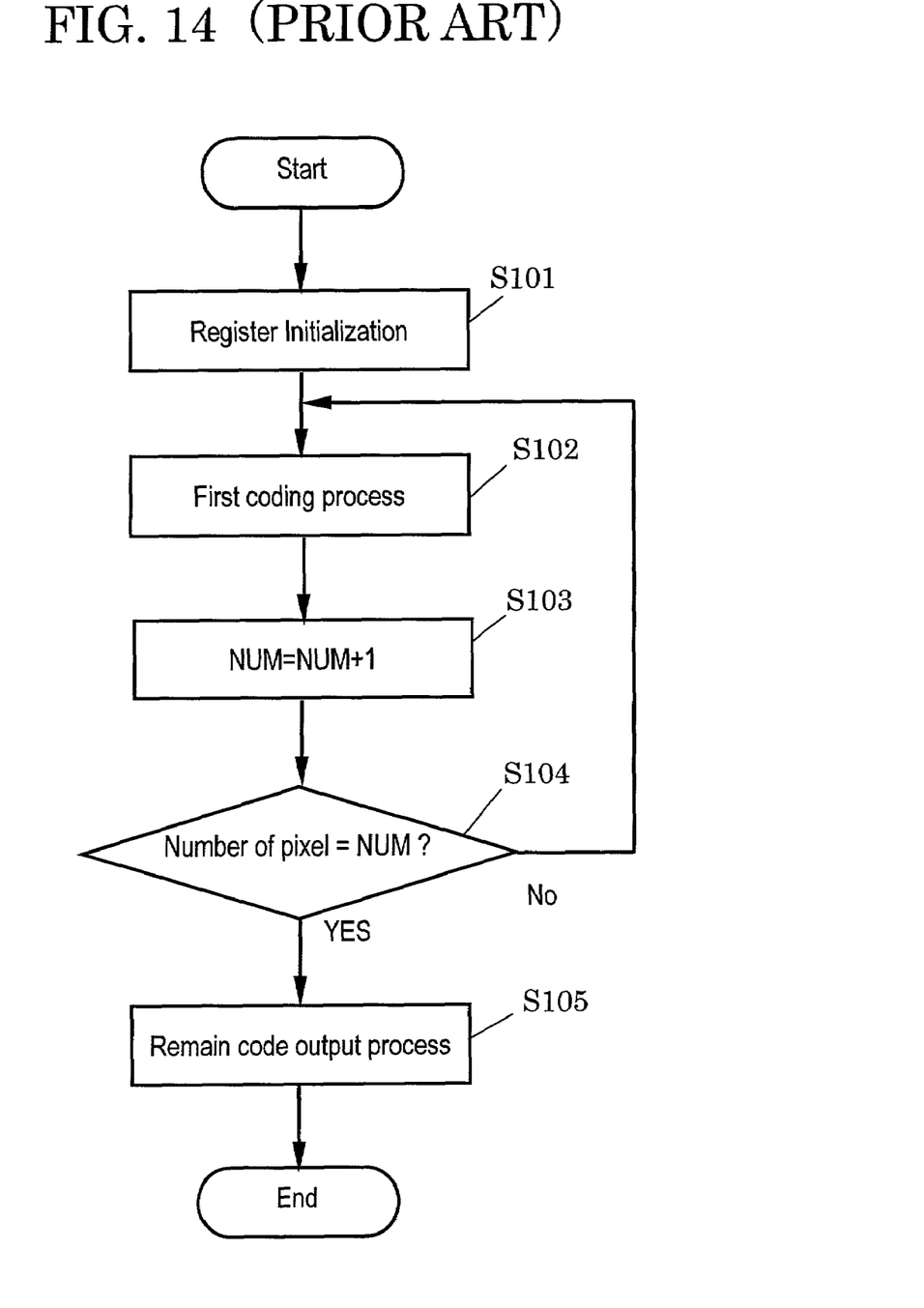
FIG. 14 is a flowchart showing operation of conventional arithmetic coding unit.
Figure 15:
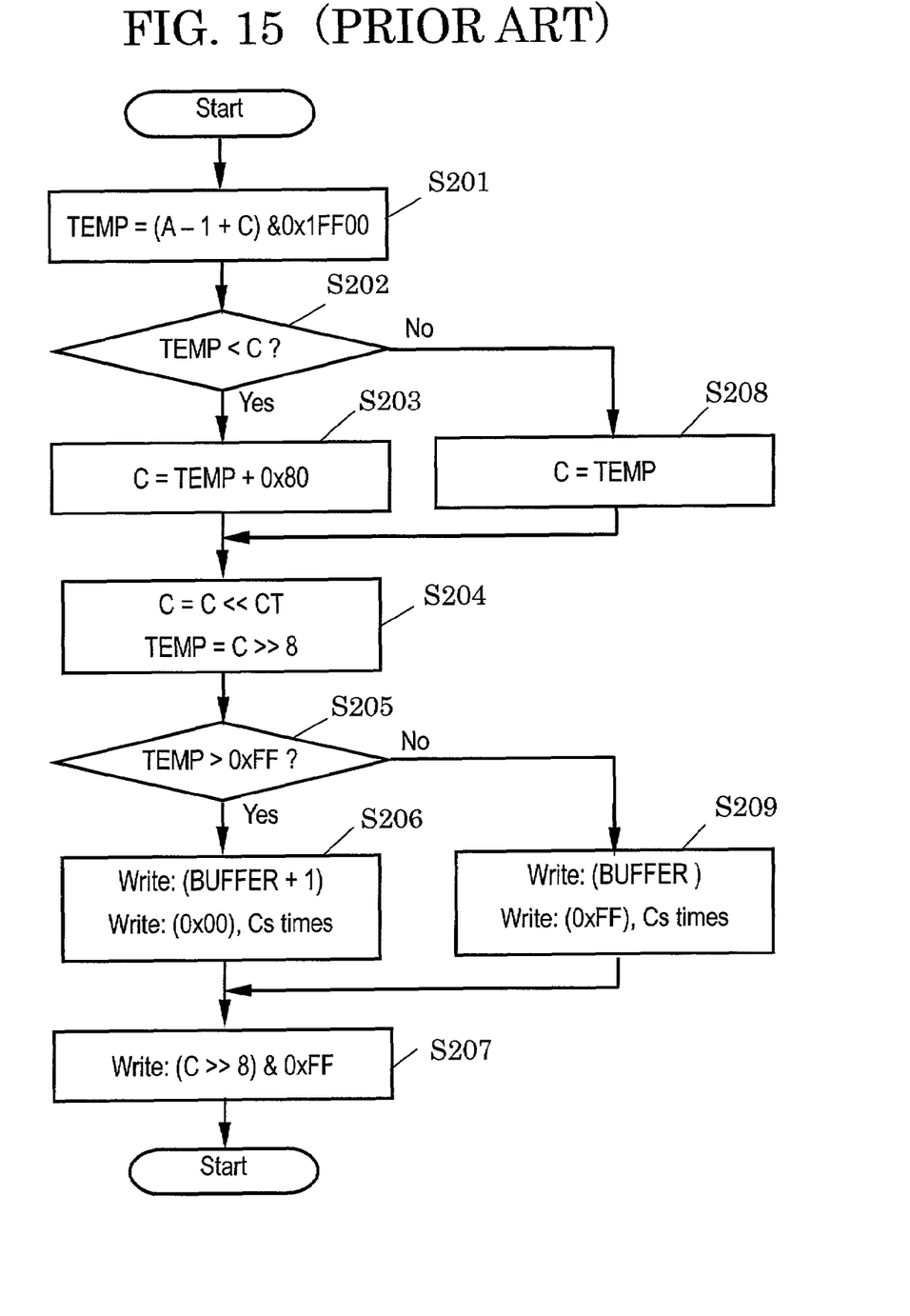
FIG. 15 is a flowchart showing remaining code output process in the prior art.

A conventional image coding device by arithmetic coding is explained by referring to FIG. 3 to FIG. 7, and FIG. 13 to FIG. 15. FIG. 3 is a flowchart showing first coding process, FIG. 4 is a diagram showing reference pixel and coding pixel, FIG. 5 is a data diagram showing data of prediction table, FIG. 6 is a flowchart showing first normalizing process, FIG. 7 is a flowchart showing first code output process, FIG. 13 is a block diagram of a conventional image coding device, FIG. 14 is a flowchart showing operation of conventional arithmetic coding unit, and FIG. 15 is a flowchart showing remaining code output process.

A conventional image coding device 7 comprises a conventional arithmetic coding unit 8, and a prediction table 8a. Image data is stored in an image memory 7a.

The operation of the image coding device 7 is explained by referring to FIG. 14.

First, contents of registers in the image coding device are initialized as shown in formula 1 to formula 9. (S101)

$$NUM=0 \qquad (1)$$

$$A=0x100 \qquad (2)$$

$$CT=8 \qquad (3)$$

$$CS=0 \qquad (4)$$

$$C=0 \qquad (5)$$

$$BUFFER=0x00 \qquad (6)$$

$$TEMP=0 \qquad (7)$$

$$Amps=0 \qquad (8)$$

$$Alps=0 \qquad (9)$$

Herein, "NUM" is a register for counting the number of input pixels, and "A" is the content of a register showing the effective region width. The initial value of "A" is "0x100" expressing the width of number line from 0 to 1, and the decimal part of the number line has a resolution of 8 bits. The numerical value following "0x" is in hexadecimal notation. "CT" is the content of a counter for code output processing, "CS" is the content of a hold counter for carry propagation, "C" is the content of a 17-bit code register, "BUFFER" is the content of a buffer for 8-bit code output, and "TEMP" is the content of a 9-bit temporary register. "Amps" denotes the number line width of superiority symbol (MPS), and "Alps" represents the number line width of inferiority symbol (LPS).

After initialization at step S101, first coding process is executed (S102).

Referring to FIG. 3, first coding process at step S102 is explained.

First, a reference pixel and an input pixel to the coding device are acquired, and pixel value "PIX" is obtained (S11). The value of the reference pixel is given as the address, and from the prediction table 8a, the value of "MPS" and the value of "SRL" (shift right logical) are acquired. The reference pixel consists of three pixels at every 8 pixels from the coding pixel as shown in FIG. 4. These pixel values are supposed to be addresses A2, A1, A0 of the prediction table 8a. FIG. 5 shows the composition of the prediction table 8a. The addresses of the prediction table 8a are 0x0 to 0x7, and the data width is 4 bits. Three out of these four bits are the value of "SRL", and one bit is the value of "MPS".

Consequently, from the obtained value of "SRL", the values of "Alps" and "Amps" are calculated (S12). Next, the value of "MPS" and the value of "PIX" are compared (S13), and when matched, the effective region width "A" is updated to the superiority symbol width "Amps" (S14). And if not matched, the effective region width "A" is updated to the inferiority symbol width "Alps", and the value of C-register is updated to C=C+Amps (S16). Then, to see if "A" is less than ½ or not, A<0x80 is judged to be true or false (S15). When the result of judgement is true, normalizing by first normalization (S17), "A" is put back to ½ or more. Otherwise, the first coding process is terminated.

FIG. 6 is a flowchart showing the operation of first normalization process S17.

First, shifting "A" and "C" by one bit to left, the value of "CT" is subtracted by one (S21). Next, by first code output process (S22), the process at step S21 and step S22 is repeated until the value of "A" becomes 0x80 or more at step S23.

Referring now to FIG. 7, the operation of first code output process at step S22 is explained.

First evaluating whether the value of "CT" is 0 or not (S31), if not 0, code output is not processed, and the code output process is terminated. When the value of "CT" is 0, "C" is shifted to right by 19 bits, and stored in a TEMP register (S32). The value of "TEMP" is evaluated to be greater than 0x FF or not (S33). When the value of "TEMP" is greater than 0x FF, the value of (BUFFER+1) is issued by one byte, and since the value of TEMP is more than 0x FF, a carry occurs, and 0x00 is issued for the number of times of hold (CS times), and the value of "BUFFER" is updated to the value of the lower 8 bits of "TEMP" (S34). When the value of "TEMP" is smaller than 0x FF, it is judged if the value of TEMP is equal to 0x FF or not (S36). When the value of "TEMP" is equal to 0x FF, considering a carry, the value of the number of times of hold "CS" is incremented by one, and the code output remains to be held (S37). In the evaluation at step S36, if the value of "TEMP" is smaller than 0x FF, the value of "BUFFER" is issued by one byte, and since "TEMP" is 0x FF and carry does not occur, and 0x FF is issued for the number of times of hold (CS times), and the value of "BUFFER" is updated to the value of "TEMP" (S38). After each code output by the value of "TEMP", the value of "C" is updated to C&0x FF, and the value of "CT" is updated to 8, so that the first code output process (S22) is terminated (S35). Herein, "&" is an operator indicating the logical product AND.

After the first coding process in this manner, the value of "NUM" is incremented by one (S103 in FIG. 14). The value of "NUM" is evaluated to be equal to the number of pixels of the setting process (S104), and if not equal, steps S102 and S103 are repeated. If equal, the remaining code output is processed (S105).

Referring to FIG. 15, the remaining code output process (S105) is explained.

In the remaining code output process, output of the code is made from the information in A-register and the coded data remaining in the C-register. In TEMP register, in the first place, (A−1+C)&0x1FF00 is stored (S201), and the value of "TEMP" is judged to be smaller than the value of "C" or not (S202). When the value of "TEMP" is smaller than the value of "C", the value of "C" is updated to TEMP+0x80 (S203). When the value of "TEMP" is not smaller than the value of "C", the value of "C" is updated to "TEMP" (S208). "C" is shifted to left by CT bits and "C" is shifted to right by 8 bits and stored in TEMP register (S204). Then, "TEMP" is judged to be larger than 0x FF or not (S205). When "TEMP" is larger than 0x FF, a carry occurs, and first (BUFFER+1) is issued by one byte code, and 0x00 is issued for the number of times of hold (CS times) (S206). When "TEMP" is smaller than 0x FF, carry does not occur, and first "BUFFER" is issued by one byte code, and 0x FF is issued for the number of times of hold (CS times) (S209). Finally, after shifting "C" to right by 8 bits, lower 8 bits of "C" are issued (S207), and the remaining code output process (S105) is terminated. That is, the process by the conventional arithmetic coding unit 8 is terminated.

In this conventional image coding device 7, however, after input of image data, the remaining code output process (S105 in FIG. 14) is required for code output from the A-register information and the remaining code data stored in the C-register. As a result, for hardware configuration, it leads to increase in the circuit scale and decline of operation clock. To solve such problems, the image coding device not requiring remaining code process has been demanded.

SUMMARY OF THE INVENTION

It is hence an object of the invention to present an image coding device not requiring remaining code output process.

To solve the problems, the image coding device of the invention comprises data adding means for adding specific data to input image data at the end of image data; and arithmetic coding unit for coding said image data to which said specific data is added. The arithmetic coding means codes the specific data after coding the image data.

DESCRIPTION OF THE PREFERRED EMBODIMENTS

The image coding device of one embodiment includes data adding means for adding specific data to input image data at the end of image data, and arithmetic coding unit for coding the image data to which said specific data is added. The arithmetic coding means codes the specific data after coding the image data.

Or the image coding device the another embodiment includes adding data generating means for generating specific data, and arithmetic coding means for receiving the specific data after input of image data, coding the specific data immediately after coding of the image data, and issuing coded data. The adding data generating means generates the specific data until the arithmetic coding means issues a specified amount of the coded data.

Hereinafter, preferred embodiments of the invention are explained by referring to FIG. 1 to FIG. 12.

(Embodiment 1)

Figure 1:
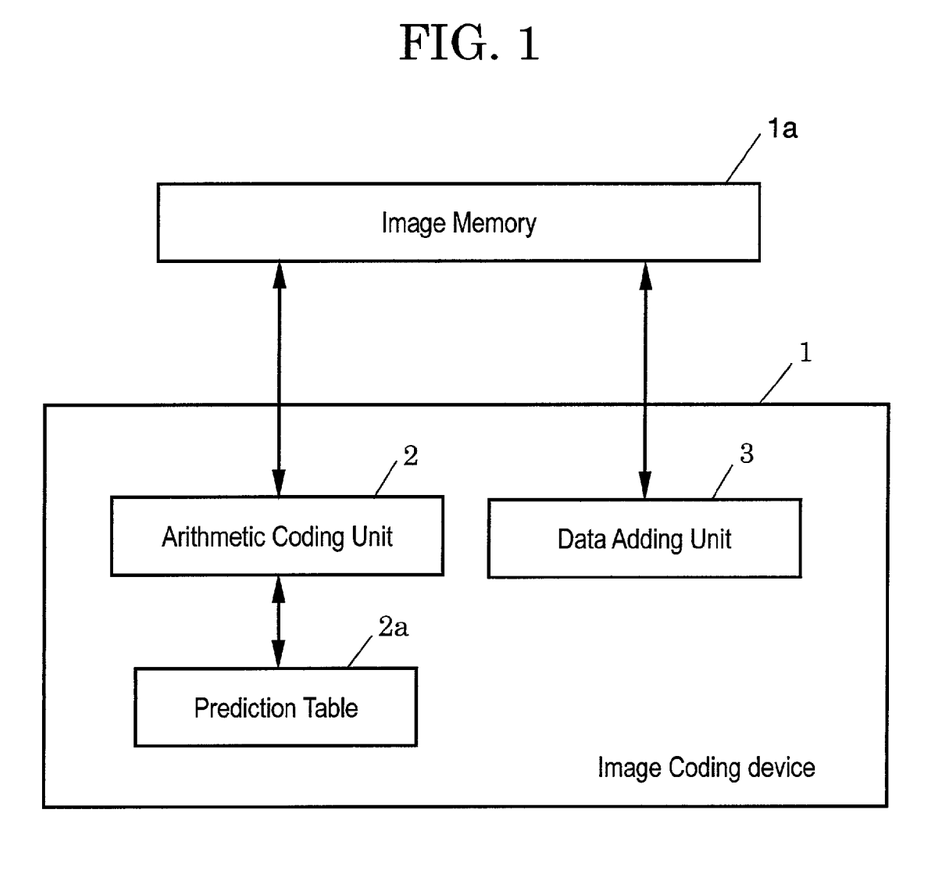
FIG. 1 is a block diagram of an image coding device in embodiment 1 of the invention.

FIG. 1 is a block diagram of an image coding device in embodiment 1 of the invention.

In FIG. 1, an image coding device 1 is composed of an arithmetic coding unit 2, a prediction table 2a, and a data adding unit 3.

In the image coding device thus composed, an outline of operation is explained.

First, the data adding unit 3 adds additional data 0x00 ("0x" shows the subsequent numerical value is in hexadecimal notation) at the end of the image data in the image memory 1a, by the number of bytes according to the value of the prediction table 2a. For example, when the SRL value of the prediction table 2a at address 0 is 7, 0x00 is added by 396 bytes. The number of added bytes is enough for discharging data C (described later) of the code register. Then the arithmetic coding unit 2 processes the image data in the image memory 1a to which the data is added from the data adding unit 3 to the original image data in the image memory 1a, by coding according to the prediction table 2a.

Figure 2:
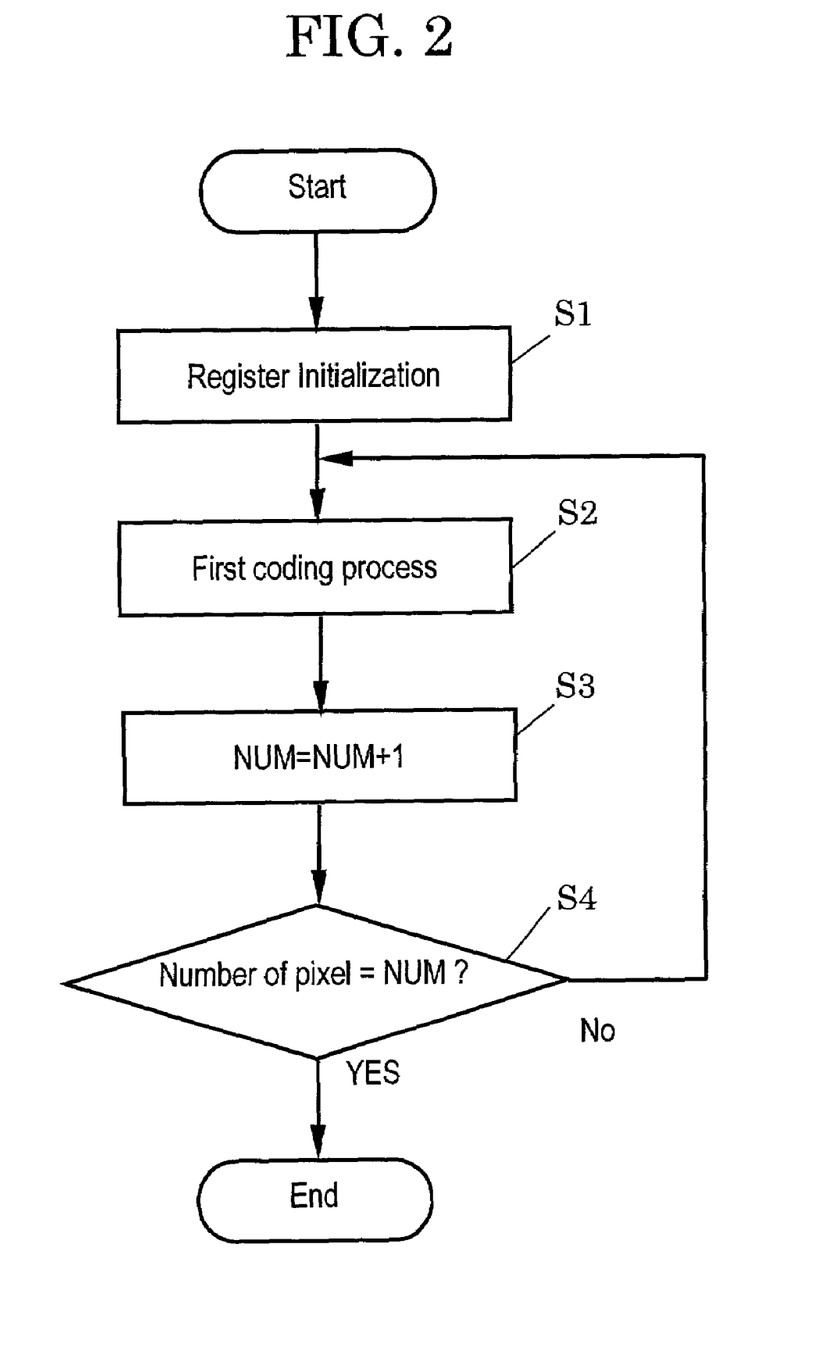
FIG. 2 is a flowchart showing operation of an arithmetic coding unit in FIG. 1.

FIG. 2 is a flowchart showing operation of the arithmetic coding unit 2 in FIG. 1.

First, contents in the registers are initialized as shown in formula 10 to formula 18 (S1).

$$NUM=0 \quad (10)$$

$$A=0x100 \quad (11)$$

$$CT=8 \quad (12)$$

$$CS=0 \quad (13)$$

$$C=0 \quad (14)$$

$$BUFFER=0x00 \quad (15)$$

$$TEMP=0 \quad (16)$$

$$Amps=0 \quad (17)$$

$$Alps=0 \quad (18)$$

Herein, "NUM" is a register for counting the number of input pixels, and "A" is the content of a register showing the effective region width. The initial value of "A" is 0x100 expressing the width of number line from 0 to 1, and the decimal part is a number line having a resolution of 8 bits. "CT" is the content of a counter for code output processing, "CS" is the content of a hold counter for carry propagation, "C" is the content of a 17-bit code register, "BUFFER" is the content of a buffer for 8-bit code output, and "TEMP" is the content of a 9-bit temporary register. "Amps" denotes the number line width of superiority symbol (MPS), and "Alps" represents the number line width of inferiority symbol (LPS). After initialization at step S1, first coding process is executed (S2).

FIG. 3 is a flowchart showing first coding process at step S2.

First, a reference pixel and an input pixel to the coding device are acquired, and pixel value "PIX" is obtained (S11). The value of the reference pixel is given as the address, and from the prediction table 2a, the value of "MPS" and the value of "SRL" are acquired. The reference pixel consists of three pixels at every 8 pixels from the coding pixel as shown in FIG. 4. These pixel values are supposed to be addresses A2, A1, A0 for the prediction table 2a. FIG. 5 shows the composition of the prediction table 2a. The addresses of the prediction table 2a are 0x0 to 0x7, and the data width is 4 bits. Three out of these four bits are the value of "SRL", and one bit is the value of "MPS".

Consequently, from the obtained value of "SRL", the values of "Alps" and "Amps" are calculated (S12). Next, the value of "MPS" and the value of "PIX" are compared (S13), and when matched, the effective region width "A" is updated to the superiority symbol width "Amps" (S14). If not matched, the effective region width "A" is updated to the inferiority symbol width "Alps", and the value of C-register is updated to C=C+Amps (S16). Then, to see if "A" is less than ½ or not, A<0x80 is judged to be true or false (S15). When the result of judgement is true (satisfying A<0x80), normalizing by first normalization at step S17, "A" is put back to ½ or more. Otherwise, the first coding process is terminated.

FIG. 6 is a flowchart showing the operation of first normalization process S17.

First, shifting "A" and "C" by one bit to left, the value of "CT" is subtracted by one (S21). Next, by first code output process (S22), the process at step S21 and step S22 is repeated until the value of "A" becomes 0x80 or more.

Referring now to FIG. 7, the operation of first code output process at step S22 is explained.

First, evaluating whether the value of "CT" is 0 or not (S31), if not 0, code output is not processed, and the code output process is terminated. When the value of "CT" is 0, the code output process is executed. In the code output processing unit, "C" is shifted to right by 8 bits, and stored in a TEMP register (S32). The value of "TEMP" is evaluated to be greater than 0x FF or not (S33). When the value of "TEMP" is greater than 0x FF, the value of (BUFFER+1) is issued by one byte, and since the value of "TEMP" is more than 0x FF, a carry occurs, and 0x00 is issued for the number of times of hold (CS times), and the value of "BUFFER" is updated to the value of the lower 8 bits of "TEMP" (S34). When the value of "TEMP" is smaller than 0x FF, it is judged if the value of "TEMP" is equal to 0x FF or not (S36). When the value of "TEMP" is equal to 0x FF, considering a carry, the value of the number of times of hold "CS" is incremented by one, and the code output remains to be held (S37). In the evaluation at step S36, if the value of "TEMP" is smaller than 0x FF, the value of "BUFFER" is issued by one byte, and since "TEMP" is 0x FF and carry does not occur, 0x FF is issued for the number of times of hold (CS times), and the value of "BUFFER" is updated to the value of "TEMP" (S38). After each code output by the value of "TEMP", the value of "C" is updated to C&0x FF, and the value of "CT" is updated to 8, so that the first code output process (S22) is terminated (S35). Herein, "&" is an operator indicating the logical product AND.

After the first coding process (S2) in this manner, the value of "NUM" is incremented by one at step S3. At step S4, the value of "NUM" is evaluated to be equal to the sum of the number of pixels of the image data and the number of data added by the data adding unit, and if not equal, steps S2 and S3 are repeated. If equal, the arithmetic coding process by the arithmetic coding unit 2 is terminated.

This is the procedure of image coding by the image coding device in embodiment 1 of the invention.

As described herein, the image coding device of the embodiment comprises the data adding unit 3 for adding specific data to input image data at the end of image data, and the arithmetic coding unit 2 not issuing remaining output code in code register after coding of final input data. By adding specific data sufficiently at the end of image data, all data in code register is discharged. That is, the hitherto required remaining code output process is not needed. As a result, the terminating process of the arithmetic coding unit 2 is simplified.

(Embodiment 2)

Figure 8:
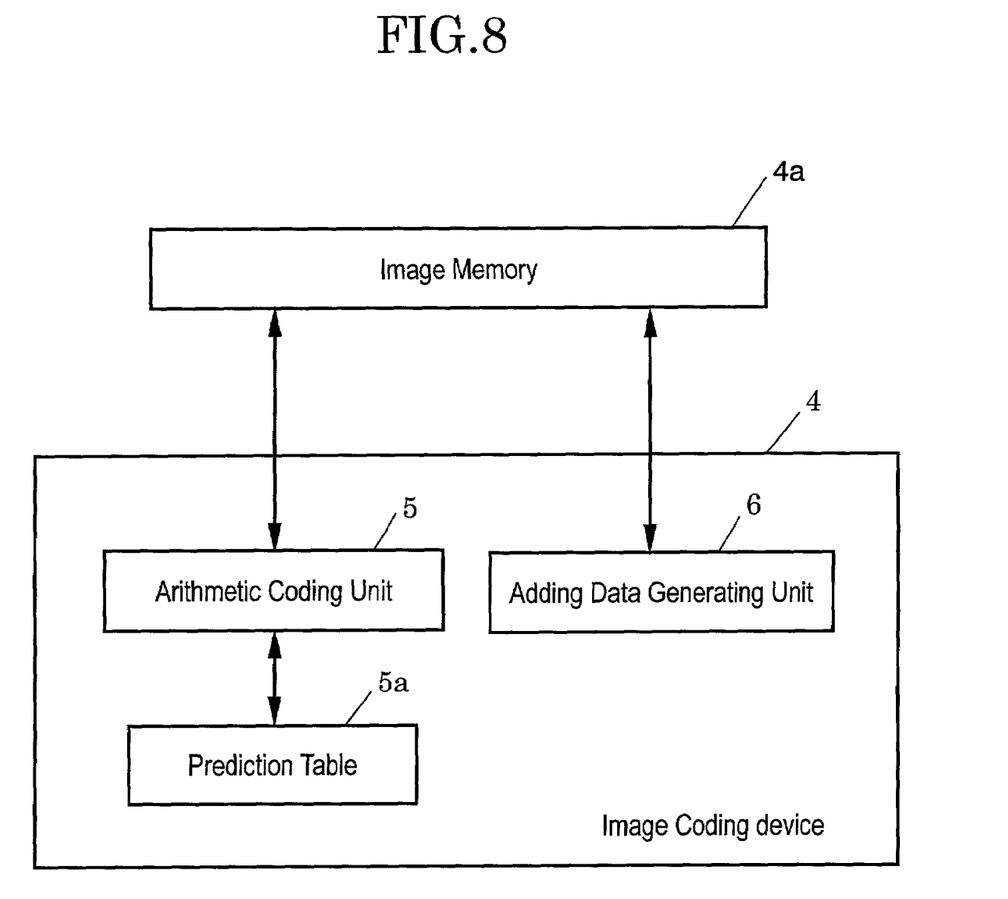
FIG. 8 is a block diagram of an image coding device in embodiment 2 of the invention.

FIG. 8 is a block diagram of an image coding device in embodiment 2 of the invention.

Figure 9:
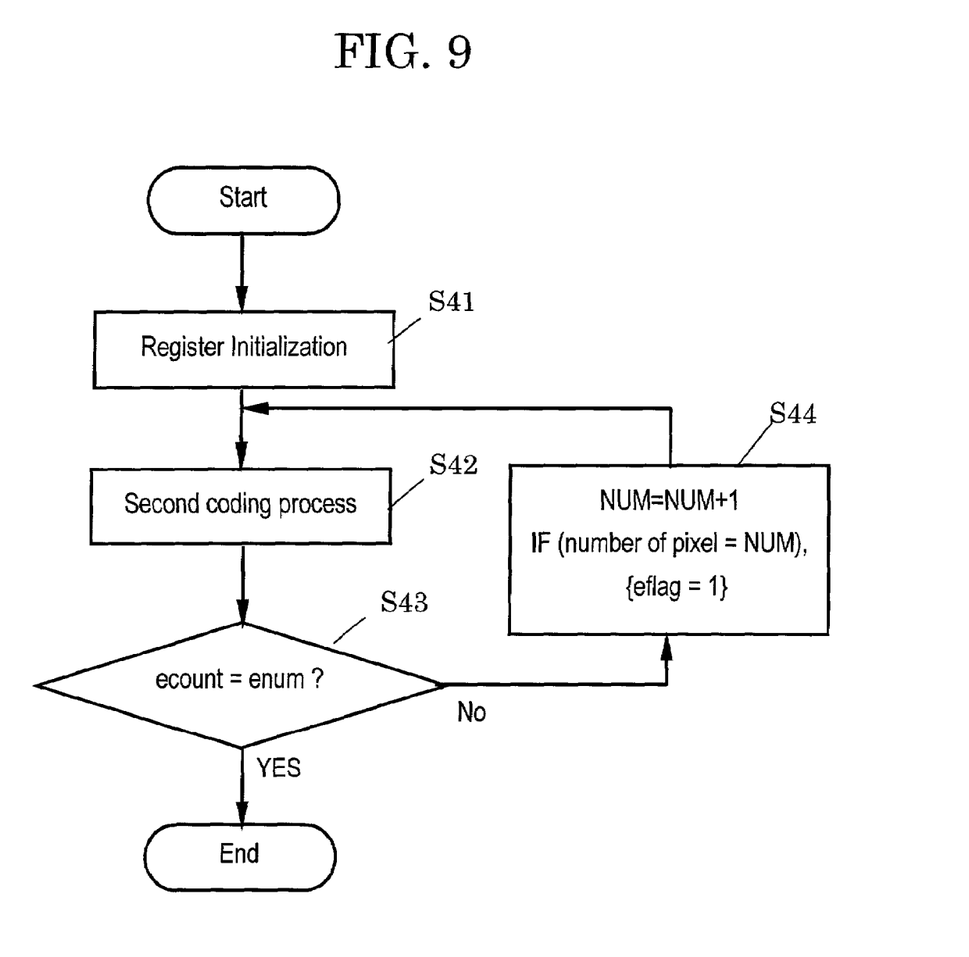
FIG. 9 is a flowchart showing operation of an arithmetic coding unit in FIG. 8.

In FIG. 8, an image coding device 4 is composed of an arithmetic coding unit 5, a prediction table 5a, and an adding data generating unit 6. Image data is stored in an image memory 4a. FIG. 9 is a flowchart showing operation of the arithmetic coding unit 5 in FIG. 8.

First, contents in the registers are initialized as shown in formula 19 to formula 29 (S41).

$$NUM=0 \tag{19}$$

$$A=0x100 \tag{20}$$

$$CT=8 \tag{21}$$

$$CS=0 \tag{22}$$

$$C=0 \tag{23}$$

$$BUFFER=0x00 \tag{24}$$

$$TEMP=0 \tag{25}$$

$$Amps=0 \tag{26}$$

$$Alps=0 \tag{27}$$

$$eflag=0 \tag{28}$$

$$ecount=0 \tag{29}$$

Herein, "NUM" is a register for counting the number of input pixels, and "A" is the content of a register showing the effective region width. The initial value of "A" is "0x100" expressing the width of number line from 0 to 1, and the decimal part is a number line having a resolution of 8 bits. "CT" is the content of a counter for code output processing, "CS" is the content of a hold counter for carry propagation, "C" is the content of a 17-bit code register, "BUFFER" is the content of a buffer for 8-bit code output, and "TEMP" is the content of a 9-bit temporary register. "Amps" denotes the number line width of MPS, and "Alps" represents the number line width of LPS. Further, "eflag" is an end flag of input image data, and "ecount" shows the content of a code data output counter after detection of end flag. After initialization at step S41, second coding process is executed (S42).

Figure 10:
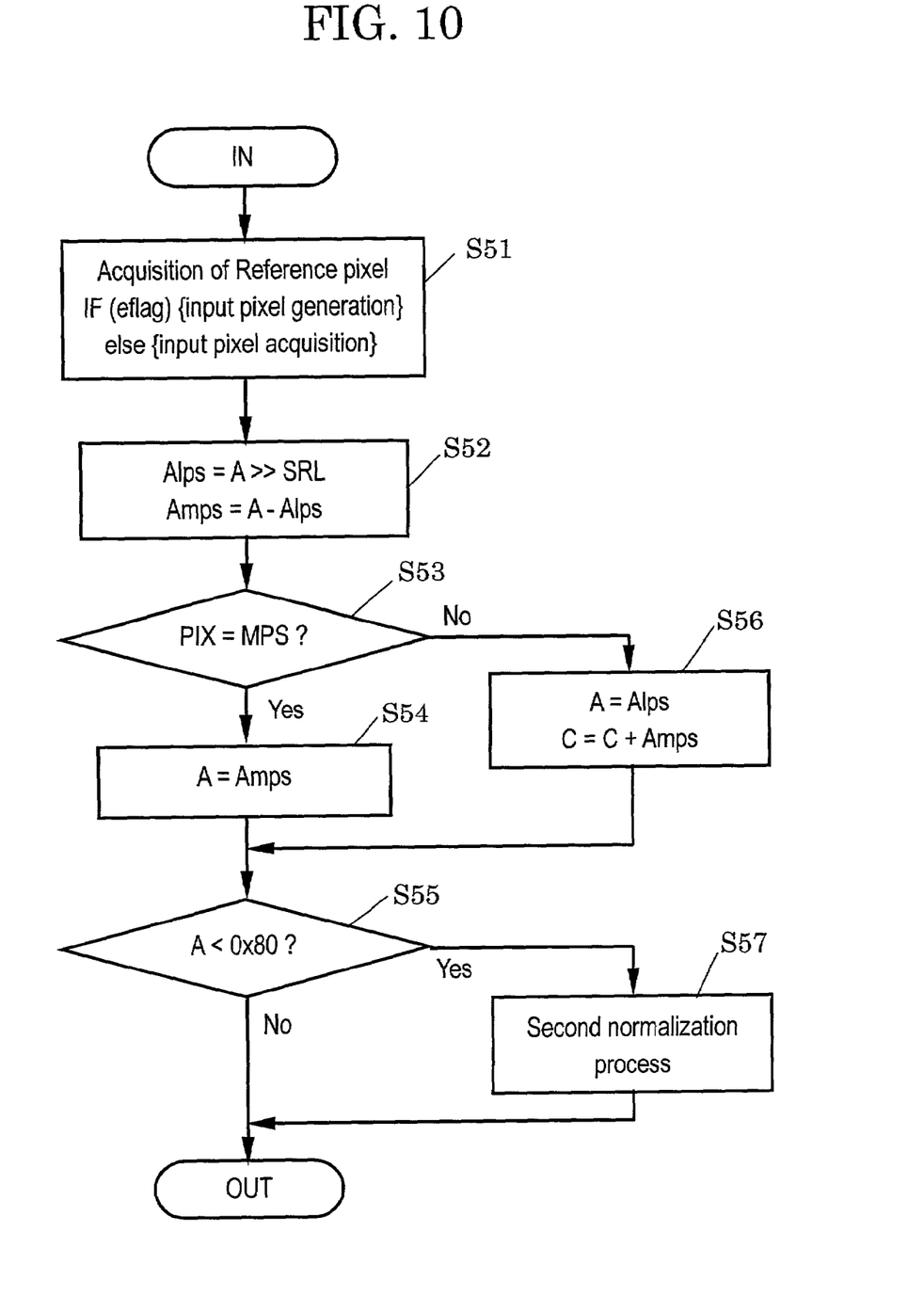
FIG. 10 is a flowchart showing second coding process.

FIG. 10 is a flowchart showing second coding process (S42).

First, a reference pixel is acquired, but when "eflag" is not set up, an input pixel to the coding device is acquired, and pixel value "PIX" is obtained, and when "eflag" is set up, the data generated by the adding data generating unit 6 is obtained as pixel value "PIX" (S51). The value of the reference pixel is given as the address, and from the prediction table 5a, the value of "MPS" and the value of "SRL" are acquired as data. The reference pixel consists of three pixels at every 8 pixels from the coding pixel as shown in FIG. 4. These pixel values are supposed to be addresses A2, A1, A0 of the prediction table 5a. FIG. 5 shows the composition of the prediction table 5a. The addresses of the prediction table 5a are 0x0 to 0x7, and the data width is 4 bits. Three out of these four bits are the value of "SRL", and one bit is the value of "MPS".

Consequently, from the obtained value of "SRL", the values of "Alps" and "Amps" are calculated (S52). Next, the value of "MPS" and the value of "PIX" are compared (S53), and when matched, the effective region width "A" is updated to the superiority symbol width "Amps" (S54). If not matched, the effective region width "A" is updated to the inferiority symbol width "Alps", and the value of C-register is updated to C=C+Amps (S56). Then, to see if "A" is less than ½ or not, A<0x80 is judged to be true or false (S55). When the result of judgement is true, normalizing by second normalization (S57), "A" is put back to ½ or more. Otherwise, the second coding process is terminated.

Figure 11:
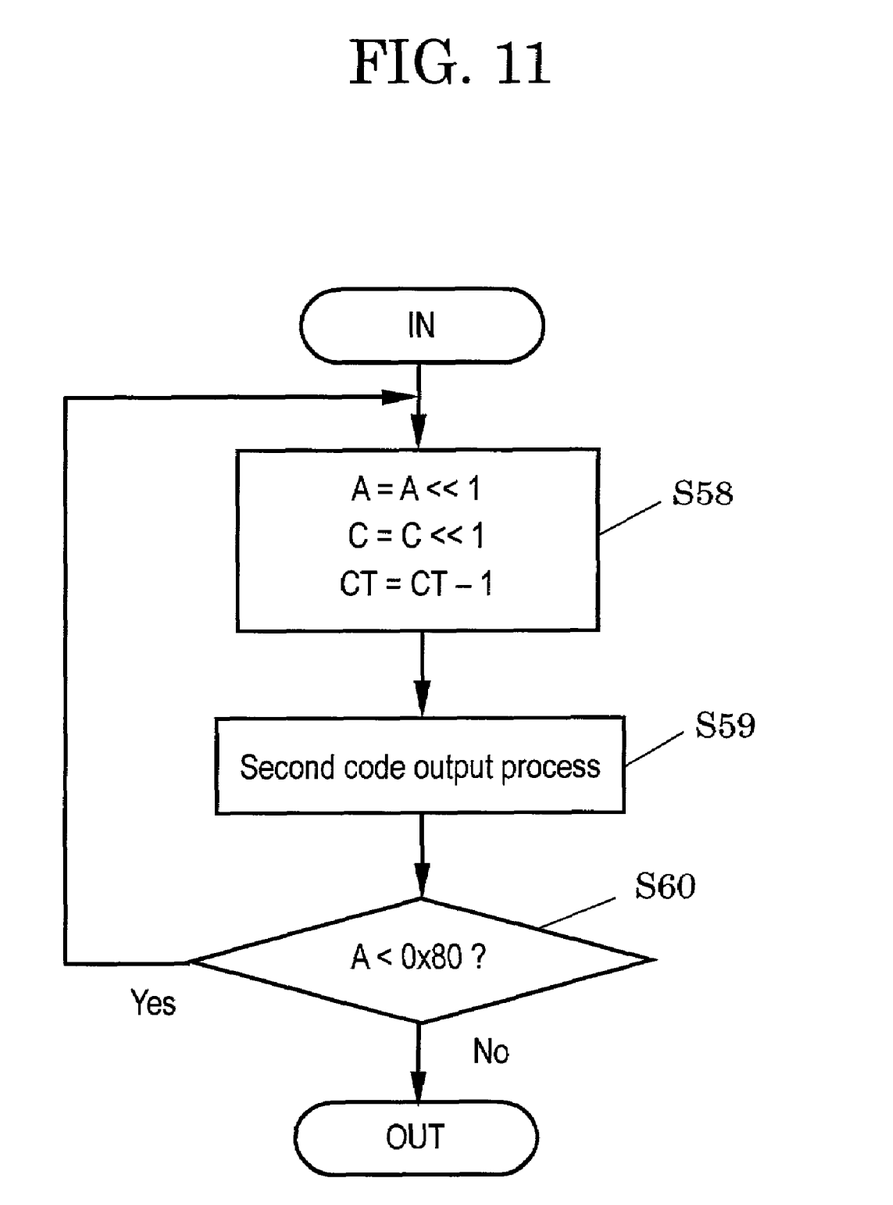
FIG. 11 is a flowchart showing second normalizing process.

FIG. 11 is a flowchart showing the operation of second normalization process (S57).

First, shifting "A" and "C" by one bit to left, the value of "CT" is subtracted by one (S58). Next, by second code output process (S59), the process at step S58 and step S59 is repeated until the value of "A" becomes 0x80 or more (S60).

Figure 12:
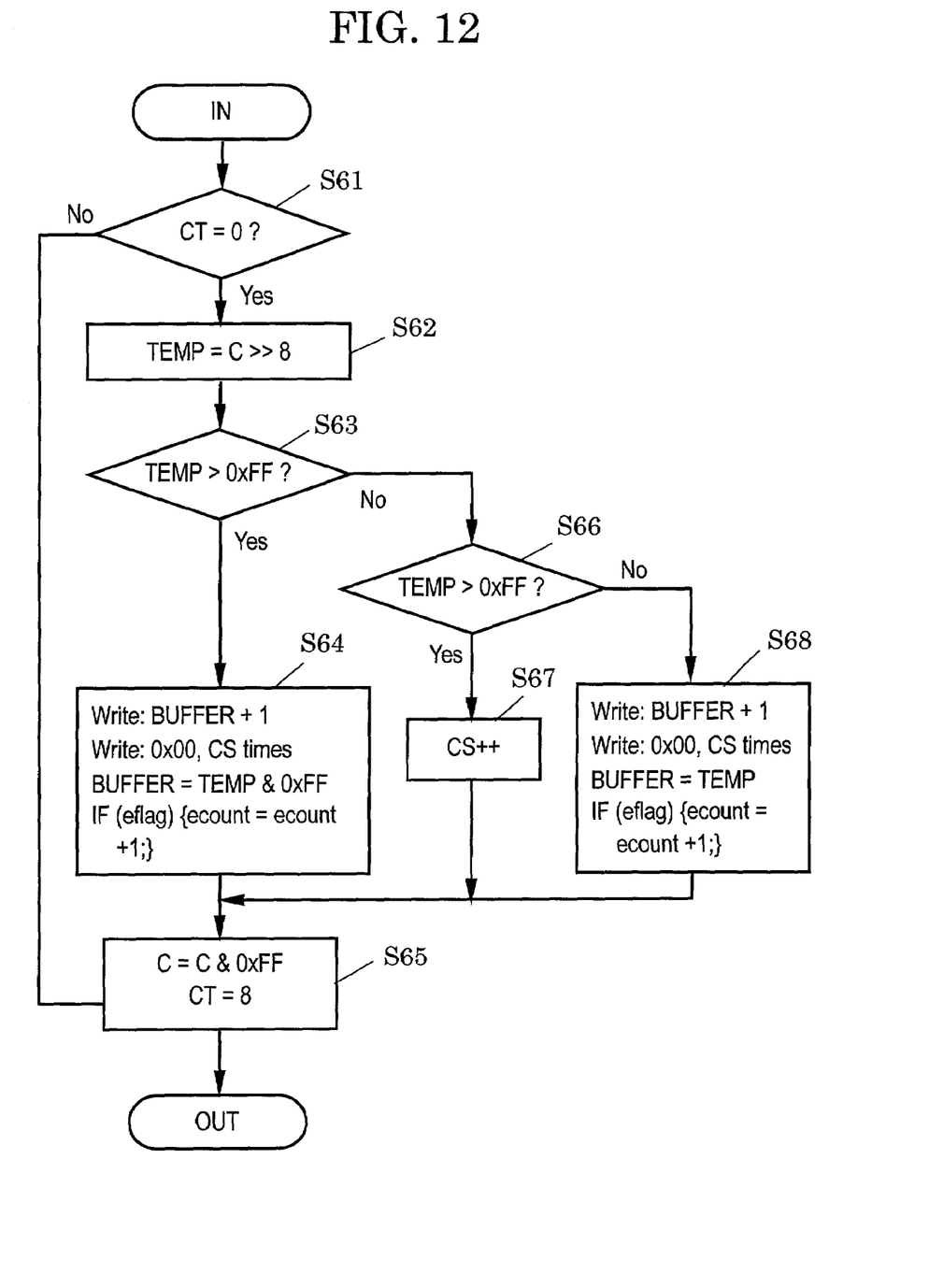
FIG. 12 is a flowchart showing second code output process.

FIG. 12 is a flowchart showing the operation of second code output process (S59).

First evaluating whether the value of "CT" is 0 or not (S61), if not 0, code output is not processed, and the code output process is terminated, and when the value of "CT" is 0, the code output process is executed. In the code output processing unit, "C" is shifted to right by 8 bits, and stored in a TEMP register (S62). The value of "TEMP" is evaluated to be greater than 0x FF or not (S63). When the value of "TEMP" is greater than 0x FF, the value of (BUFFER+1) is issued by one byte, and since the value of "TEMP" is more than 0x FF, a carry occurs, and 0x00 is issued for the number of times of hold (CS times), and the value of "BUFFER" is updated to the value of the lower 8 bits of "TEMP", and when "eflag" is set up, the value of "ecount" is incremented by one (S64). When the value of "TEMP" is smaller than 0x FF, it is judged if the value of TEMP is equal to 0x FF or not (S66). When the value of "TEMP" is equal to 0x FF, considering a carry, the value of the number of times of hold (the value of "CS") is incremented by one, and the code output remains to be held (S67). In the evaluation at step S66, if the value of "TEMP" is smaller than 0x FF, the value of "BUFFER" is issued by one byte, and since "TEMP" is 0x FF and carry does not occur, and 0x FF is issued for the number of times of hold (CS times), and the value of "BUFFER" is updated to the value of "TEMP", and when "eflag" is set up, the value of "ecount" is incremented by one (S68). After each code output by the value of "TEMP", the value of "C" is updated to C&0x7 FFFF, and the value of "CT" is updated to 8 (S65), so that the second code output process (S59) is terminated.

After the second coding process in this manner, judging if "ecount" is matched with the set value of "enum" (S43), and when matched, the arithmetic coding process by the arithmetic coding unit 5 is terminated. If not matched, the number of input pixels is incremented by one, and when the number of input pixels (NUM) is equal to the number of pixels of setting process, "eflag" is set up, and the process returns to step S42 (S44).

This is the procedure of image coding by the image coding device in this embodiment.

As described herein, the image coding device of the embodiment comprises the adding data generating unit 6 for generating specific data as input data until the data of a specified number of bits is issued as the code data from the code register after end of input data, and the arithmetic coding unit 5 determining the end of coding when the data of a specified number of bits is issued as the code data from the code register after end of input data. By generating specific data sufficiently as input data after input of image data, all data in code register are discharged. Hence the hitherto required remaining code output process is not needed, and the terminating process of the arithmetic coding unit 5 is simplified.

What is claimed is:

1. An image coding device comprising:
   a prediction table;
   a data adding unit; and
   an arithmetic coding unit,
   wherein the data adding unit adds specific data at the end of an image data according to a value of the prediction table, and
   said arithmetic coding unit codes the specific data after coding the image data, wherein the arithmetic coding unit terminates an arithmetic coding process when an incremented value in the arithmetic coding process is equal to a sum of a number of pixels of the image data and the specific data added by the data adding unit.

* * * * *